(12) United States Patent
Cotton et al.

(10) Patent No.: US 11,486,025 B2
(45) Date of Patent: Nov. 1, 2022

(54) TITANIUM-BASED ALLOY AND METHOD FOR MANUFACTURING A TITANIUM-BASED ALLOY COMPONENT BY AN ADDITIVE MANUFACTURING PROCESS

(71) Applicant: The Boeing Company, Chicago, IL (US)

(72) Inventors: James D. Cotton, Issaquah, WA (US); Arash Ghabchi, Seattle, WA (US); Matthew J. Crill, Mill Creek, WA (US); Natalia G. Mitropolskaya, Moscow (RU)

(73) Assignee: The Boeing Company, Chicago, IL (US)

(*) Notice: Subject to any disclaimer, the term of this patent is extended or adjusted under 35 U.S.C. 154(b) by 130 days.

(21) Appl. No.: 16/832,072

(22) Filed: Mar. 27, 2020

(65) Prior Publication Data

US 2020/0354815 A1   Nov. 12, 2020

Related U.S. Application Data

(63) Continuation of application No. 15/801,050, filed on Nov. 1, 2017, now Pat. No. 10,851,439.

(30) Foreign Application Priority Data

Oct. 19, 2017   (RU) .......................... RU2017136865

(51) Int. Cl.
*C22C 14/00*   (2006.01)
*B33Y 10/00*   (2015.01)
(Continued)

(52) U.S. Cl.
CPC .............. *C22C 14/00* (2013.01); *B33Y 10/00* (2014.12); *B33Y 70/00* (2014.12); *B22F 10/00* (2021.01); *C22F 1/183* (2013.01)

(58) Field of Classification Search
None
See application file for complete search history.

(56) References Cited

U.S. PATENT DOCUMENTS

| 4,919,886 A | 4/1990 | Venkataraman et al. |
| 5,074,907 A * | 12/1991 | Amato .................. C22C 1/0458 |
| | | 419/19 |

(Continued)

FOREIGN PATENT DOCUMENTS

| CN | 103748243 | 4/2014 |
| CN | 105522152 | 4/2016 |

(Continued)

OTHER PUBLICATIONS

Siemers, C. et al., "Rare Earth Metals in Titanium Allloys—A Systematic Study", Conference paper downloaded from Researchgate.net/publication/233790159, Uploaded by Carsten Siemers on May 16, 2014.*

(Continued)

*Primary Examiner* — George Wyszomierski
(74) *Attorney, Agent, or Firm* — Walters & Wasylyna LLC (57) ABSTRACT

An alpha-beta titanium-based alloy including titanium; one of 0.001-1.0 wt. % neodymium, 0.001-1.0 wt. % dysprosium, or 0.001-0.5 wt. % erbium; and at least one of aluminum, zirconium, tin, oxygen, molybdenum, vanadium, niobium, iron, and chromium present in amounts defined based on an aluminum equivalent and a molybdenum equivalent, wherein the aluminum equivalent (Al-eq) is between 0 to 7.5% and the molybdenum equivalent (Mo-eq) is between 2.7 to 47.5, and wherein the aluminum equivalent (Al-eq) and the molybdenum equivalent (Mo-eq) are defined, in weight percents, as follows:

Al-eq=(Al %)+(Zr %)/6+(Sn %)/3+10*(O %)

(Continued)

Mo-eq=(Mo %)+0.67*(V %)+0.33*(Nb %)+2.9*(Fe %)+1.6*(Cr %).

20 Claims, 7 Drawing Sheets (51) Int. Cl.
  *B33Y 70/00*   (2020.01)
  *C22F 1/18*   (2006.01)
  *B22F 10/00*   (2021.01)

(56) References Cited

U.S. PATENT DOCUMENTS

| | | | |
|---|---|---|---|
| 5,156,807 A * | 10/1992 | Nagata | C22C 14/00 148/421 |
| 5,256,369 A | 10/1993 | Ogawa et al. | |
| 5,433,603 A * | 7/1995 | Mollenhauer | A61C 7/12 433/20 |
| 5,478,524 A | 12/1995 | Nakanose et al. | |
| 6,007,923 A * | 12/1999 | Shimizu | B23K 35/005 428/586 |
| 6,824,667 B2 * | 11/2004 | Griego | C25D 7/006 205/238 |
| 2005/0153154 A1 | 7/2005 | Griego | |
| 2009/0169416 A1 * | 7/2009 | Li | C22C 14/00 420/420 |

FOREIGN PATENT DOCUMENTS

| | | |
|---|---|---|
| CN | 106756232 | 5/2017 |
| CN | 107109541 | 8/2017 |
| JP | 2006-213961 | 8/2006 |
| WO | WO 2017/077137 | 5/2017 |

OTHER PUBLICATIONS

SAE International, AMS4911N (2014).
SAE International, AMS4998E (2013).
S.M.L. Sastry et al: "Structure and properties of rapidly solidified dispersion-strengthened titanium alloys: Part I. Characterization of dispersoid distribution, structure, and chemistry," Metallurgical Transactions A—Physical Metallurgy and Materials Science, vol. 15, No. 7, https://rd.springer.com/article/10.1007%2FBF02648575 (Jul. 1, 1984).
Federal Institute of Industrial Property, Office Action, with English translation, App. No. 2017136865/05(064256) (dated Nov. 25, 2020).
China National Intellectual Property Administration, Office Action, with English translation, App. No. 201810978802.8 (dated Jun. 3, 2021).
Li et al: "Kinetics of the α grain growth in a binary Ti-44Al alloy and a ternary Ti-44Al-0.15Gd Alloy," *Materials Science and Engineering*, pp. 430-434 (2002).
China National Intellectual Property Administration, Office Action, with English translation, App. No. 201810978802.8 (dated Feb. 7, 2022).
Canadian Intellectual Property Office, Office Action, App. No. 3,017,191 (dated May 16, 2022).
Siemers, C. et al.: "Rare Earth Metals in Titanium Alloys-A Systematic Study," Conference paper (2012). Uploaded by Carston Siemers on May 16, 2014: https://www.researchgate.net/publication/233790159.

* cited by examiner

TITANIUM-BASED ALLOY AND METHOD FOR MANUFACTURING A TITANIUM-BASED ALLOY COMPONENT BY AN ADDITIVE MANUFACTURING PROCESS

PRIORITY

This application is a continuation of U.S. Ser. No. 15/801,050 filed on Nov. 1, 2017, which claims priority from Russian Patent Application No. 2017136865 filed on Oct. 19, 2017.

FIELD

This field of this application relates to titanium-based alloys and methods for manufacturing titanium-based alloy components.

BACKGROUND

Components produced from titanium-based alloys are widely used for aerospace applications due to high strength-to-weight, excellent corrosion resistance, and high-temperature properties. However, the high cost of raw materials along with a high buy-to-fly ratio drives the aerospace industry in the development of near net-shape technologies, including additive manufacturing processes.

Titanium-based alloys exhibit solidification behavior in which crystals of high-temperature beta phase nucleate and grow to long dimensions during additive deposition processes. Microstructure containing large grains results in material with lower static as well as fatigue properties. Also, the elongated beta grains leave a crystallographic texture that results in more anisotropic properties.

In addition, the condition that results in formation of coarse beta grain size can also contribute to formation of alpha phase at the grain boundary, which, if severe, contributes to low elongation. Another issue manifesting during additive manufacturing processes is a combination of slow solidification (lower cooling rate) with high thermal gradient—this combination especially promotes large, elongated grains. Thus, such deficiencies limit the use of titanium-based alloys in additive manufacturing in more critical applications, such as those sized by cyclic or thermal fatigue or static property-sized applications with smaller tensile property margins. Accordingly, those skilled in the art continue with research and development in field of titanium-based alloys and methods for manufacturing titanium-based alloy components by an additive manufacturing process.

SUMMARY

In one embodiment, a titanium-based alloy includes 0.001-1.0 wt. % in total of at least one lanthanide series element, remainder of titanium and impurities.

In another embodiment, a method for manufacturing a titanium-based alloy component includes providing a titanium-based alloy starting material comprising 0.001-1.0% by weight in total of at least one lanthanide series element, remainder of titanium and impurities, and forming a titanium-based alloy component by an additive manufacturing process from the titanium-based alloy starting material.

Other embodiments of the disclosed titanium-based alloy and method for manufacturing a titanium-based alloy component will become apparent from the following detailed description, the accompanying drawings and the appended claims.

BRIEF DESCRIPTION OF THE DRAWINGS

FIGS. 3A through 3I show microstructures of experimental alloys after annealing;

DETAILED DESCRIPTION

The present description relates to a titanium-based alloy comprising 0.001-1.0% by weight in total of at least one lanthanide series element. A titanium-based alloy is defined as any alloy having more than 50% by weight of titanium.

In an aspect, the titanium-based alloy includes additional amounts of at least one of aluminum (Al), zirconium (Zr), tin (Sn), oxygen (O), molybdenum (Mo), vanadium (V), niobium (Nb), iron (Fe), and chromium (Cr), wherein the amounts are defined based on their aluminum equivalent and molybdenum equivalent values in which the aluminum equivalent (Al-eq) is between 0 to 7.5% and the molybdenum equivalent (Mo-eq) is between 2.7 to 47.5, and in which Al-eq and Mo-eq are defined as follows:

$$Al\text{-}eq = Al\ \% + Zr\ \%/6 + Sn\ \%/3 + 10*(O\ \%)$$

$$Mo\text{-}eq = Mo\ \% + 0.67*V\ \% + 0.33*Nb\ \% + 2.9*Fe\ \% + 1.6*Cr\ \%$$

Lanthanide series elements consist of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Tb), and lutetium (Lu). These elements are termed as "lanthanide series elements" because each of the elements in the lanthanide series are chemically similar.

Small amounts of lanthanide series elements are added to the titanium-based alloy of the present description to decrease the tendency for the development of large grains during solidification. Although the present invention is not limited by theory, this effect of the addition of lanthanide series elements is believed to be result from their high affinity for oxygen, tendency to cluster in the liquid phase, and low solubility in the solid phase, all of which tend perturb the solid/liquid front during solidification, thereby disrupting the growth of large grains, resulting in a finer grain size in the solidified microstructure. Finer grain size in a solidified titanium-based alloy provides for better strength, ductility and fatigue properties.

A minimum total amount of the one or more lanthanide series elements in the titanium-based alloy is 0.001%, preferably 0.01%, by weight. If the total amount of the one or more lanthanide series elements is too low, then the intended effect is not achieved.

A maximum total amount of the one or more lanthanide series elements is 1.0%, preferably 0.5%, by weight. If the total amount of the one or more lanthanide series elements is too high, then the cost of the additions of the lanthanide series elements becomes too great.

Accordingly, the titanium-based alloy of the present description includes a total of one or more lanthanide series elements in a range of 0.001-1.0% by weight, and preferably in a range of 0.01-0.5% by weight.

In an aspect, the one or more lanthanide series elements are selected from neodymium (Nd), gadolinium (Gd), dysprosium (Dy), and erbium (Er), and the titanium-based alloy includes 0.001-1.0% by weight, preferably 0.01-0.5% by weight, in total of Nd, Gd, Dy, and Er.

In a specific example, the lanthanide series element is gadolinium (Gd), and the titanium-based alloy includes 0.001-1.0% by weight, preferably 0.01-0.5% by weight, of Gd.

Using the phases present at room temperature, titanium alloys are divided into three main classes: alpha, alpha-beta, and beta. Each class has distinctive well-known characteristics. Alpha and beta stabilizers are added to titanium-based alloys to stabilize the different phases of titanium.

The titanium-based alloys of the present description include alpha, alpha-beta, and beta classes of titanium-based alloys, in which the one or more lanthanide series elements are added as described above. Accordingly, the titanium-based alloy may further include various alpha and/or beta stabilizers.

In a specific aspect, the titanium-based alloy is an alpha-beta titanium-based alloy. Alpha-beta titanium-based alloys have excellent corrosion resistance and high temperature properties and are heat-treatable to high strengths. For these and other reasons, alpha-beta alloys are particularly attractive for components formed by additive manufacturing processes. However, the solidification of alpha-beta titanium-based alloys may cause large grains of high-temperature beta phase to nucleate and grow to long dimensions during the additive deposition processes. These large grain dimensions degrade ductility, strength and other properties of the alpha-beta titanium alloys. Therefore, the effect of the addition of small amounts of lanthanide series elements on decreasing the tendency for the development of large grains during solidification may find particular utility in regards to alpha-beta titanium-based alloys. Exemplary conventional alpha-beta titanium-based alloys include, for example, Ti-6Al-2Sn-4Zr-2Mo, Ti-6Al-4Zr-0.5Nb-0.8Mo-3Sn-0.3Si (VT18Y), and Ti-6Al-4V.

In an example, the alpha-beta titanium-base alloy of the present description may include, by weight percent, 5.0-7.0% (preferably 5.5-6.5%) aluminum (Al), 1.0-3.0% (preferably 1.5-2.5%) tin (Sn), 3.0-5.0% (preferably 3.5-4.5%) zirconium (Zr), 1.0-3.0% (preferably 1.5-2.5%) molybdenum (Mo), and 0.001-1.0% (preferably 0.01-0.5%), in total of one or more lanthanide series elements, remainder of titanium and impurities. Thus, titanium-base alloy may be termed as a variation of Ti-6Al-2Sn-4Zr-2Mo alloy.

In another example, the alpha-beta titanium-base alloy of the present description may include, by weight percent, 5.0-7.0% (preferably 5.5-6.5%) aluminum (Al), 3.0-5.0% (preferably 3.5-4.5%) zirconium (Zr), 0.01-1.0% (preferably 0.25-0.75%) niobium (Nb), 0.01-1.5% (preferably 0.5-1.0%) molybdenum (Mo), 2.0-4.0% (preferably 2.5-3.5%) tin (Sn), 0.01-1.0% (preferably 0.1-0.5%) silicon (Si), and 0.001-1.0% (preferably 0.01-0.5%), in total of one or more lanthanide series elements, remainder of titanium and impurities. Thus, titanium-base alloy may be termed as a variation of Ti-6Al-4Zr-0.5Nb-0.8Mo-3Sn-0.3Si ("VT18Y").

In yet another example, the alpha-beta titanium-base alloy of the present description may include 5.0-7.0% (preferably 5.5-6.5%) aluminum (Al), 3.0-5.0% (preferably 3.5-4.5%) vanadium (V), and 0.001-1.0% (preferably 0.01-0.5%), in total of one or more lanthanide series elements, remainder of titanium and impurities. Thus, titanium-base alloy may be termed as a variation of Ti-6Al-4V alloy.

In an aspect, the titanium-based alloy may be in the form of a starting material that can be melted and solidified to result in a component having above-recited composition. In an example, the starting material may be in the form of a wire having the above-recited composition. In another example, the starting material may be in the form of powder particulates having the above-recited composition, or the starting material may be in the form of powder particulates of different compositions that, when combined, have the above-recited composition.

An exemplary starting material in the form of powder particulates may be produced by any suitable process (e.g. gas atomization). In an example, the powder particulates may be produced in a non-contaminating atmosphere from appropriate feed materials. The feed materials may be multiple melted in which a first melt is made by consumable electrode, non-consumable electrode, electron beam cold hearth, or plasma arc cold hearth melting practice, and subsequent melt or melts made under vacuum using vacuum arc remelting (VAR) practice, in which alloy additions are added prior to the final VAR melt. The atmosphere for non-consumable electrode melting may be vacuum or argon and/or helium at an absolute pressure less than or equal to 1000 mm of mercury. The size of the exemplary powder particulates is not limited. In an example, the power particulates may be sized to pass through a No. 35 (500 µm) sieve, with not more than 5% by weight passing through a No. 325 (45 µm) sieve, determined in accordance with ASTM B 214. The density of the exemplary powder particulates is not limited. In an example, the density of the powder particulates may be 60% or more of a hot compacted density value determined in accordance with ASTM B 527.

An exemplary starting material in the form of wire may be produced by any suitable process (e.g. drawing).

In another aspect, the titanium-based alloy may be in the form of a component having above-recited composition, in which the component is a net-shape component having its final size and shape or a near net-shaped component that can be post-processed to result in a component having its final size and shape. The shape and size of the component are not limited. In an example, the component is a component of an aircraft or space vehicle.

An exemplary component formed from the titanium-based alloy may be produced by any suitable process. One benefit of the titanium-based alloy of the present description is its decrease in the tendency for the development of large grains during solidification. Therefore, the titanium-based alloy of the present description may be advantageously employed in manufacturing processes, such as additive manufacturing processes, in which avoiding large grains during solidification would be highly beneficial.

Figure 1:
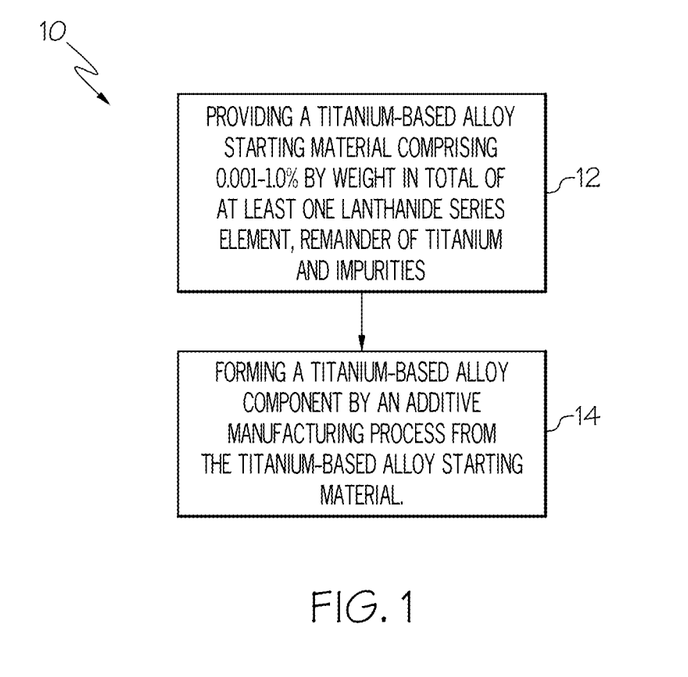
FIG. 1 is a flow diagram showing a method for manufacturing a titanium-based alloy component.

As illustrated in FIG. 1, the present description relates to a method for manufacturing a titanium-based alloy component 10 including providing a titanium-based alloy starting material comprising 0.001-1.0% by weight in total of at least one lanthanide series element, remainder of titanium and impurities 12, and forming the titanium-based alloy component by an additive manufacturing process from the titanium-based alloy starting material 14.

In an aspect, the additive manufacturing process includes heating the titanium-based alloy to above or within a melting temperature range of the titanium-based alloy. Thereby, the addition of the at least one lanthanide series element to the titanium-based alloy decreases the tendency for the development of large grains during solidification during cooling from above or within the melting temperature range to below the melting temperature range of the titanium-based alloy.

An additive manufacturing process for manufacturing a component formed from the titanium-based alloy is not limited. The additive manufacturing process may include a powder-feed process or a wire-feed process, in which the powder or wire are formed of the titanium-based alloy.

In an example, the powder-based additive manufacturing may include steps of: (i) depositing a first layer of powder material; (ii) at least partly melting and solidifying a first portion of a first layer of powder material, the first portion corresponding to a first region of a component; (iii) depositing a second layer of powder material onto the first layer; (iv) at least partly melting and solidifying a second portion of the second layer of powder material, the second portion corresponding to a second region of the component, the first region and the second region being joined to one another; and (v) depositing successive layers of powder material onto the previous layers and at least partly melting and solidifying a portion of each successive layer to produce the component, each successive layer portion corresponding to a successive region of the component.

In another example, a wire-based additive manufacturing process may include steps of: (i) melting, depositing and solidifying a first portion of a wire material to form a first region of a component; (ii) melting, depositing and solidifying a second portion of the wire material to form a second region of the component, the first region and the second region being joined to one another; and (iii) melting, depositing and solidifying successive portions of the wire material to form successive regions of the component onto the previous regions of the component.

Exemplary additive manufacturing processes include electron beam melting (EBM), selective laser melting (SLM), selective laser sintering (SLS), laser metal forming (LMF), direct metal laser sintering (DMLS), and direct metal laser melting (DMLM).

Experimental Example

Four experimental alpha-beta titanium-based alloys having the compositions indicated in Table 1 were produced by gas tungsten arc welding (GTAW) to determine the effects of lanthanide series elements on solidification of titanium-based alloys.

TABLE 1

| 1 | Ti6Al2Sn4Zr2Mo0.1Si | alpha-beta | Large, elongated beta grains (dark contrast) visible in fusion zone |
| 2 | Ti6Al2Sn4Zr0.4Nb0.7Mo0.18Si0.05Gd | alpha-beta | Beta grain size is refined in fusion zone |
| 3 | Ti6Al2Sn4Zr0.5Nb0.7Mo0.18Si0.2Gd | alpha-beta | Beta grain size is refined in fusion zone |
| 4 | Ti6Al2Sn4Zr0.5Nb0.7Mo0.18Si0.1Gd | alpha-beta | Beta grain size is refined in fusion zone |

Figure 2A:
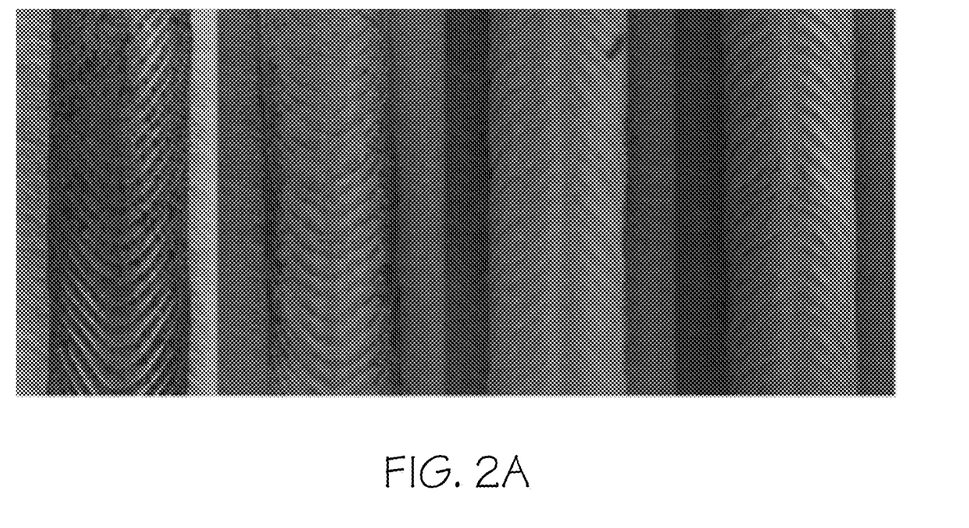
FIGS. 2A, 2B and 2C show microstructures of experimental alloys in the as-cast condition.
Figure 2B:
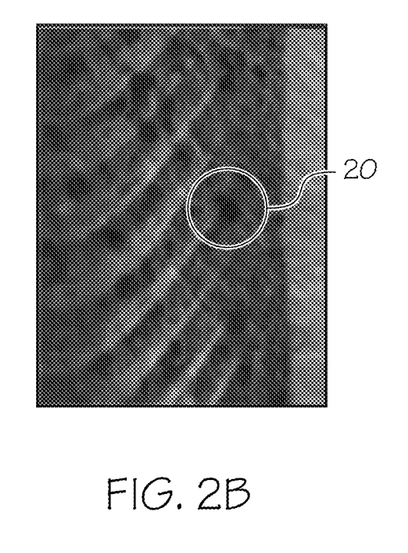
Figure 2C:
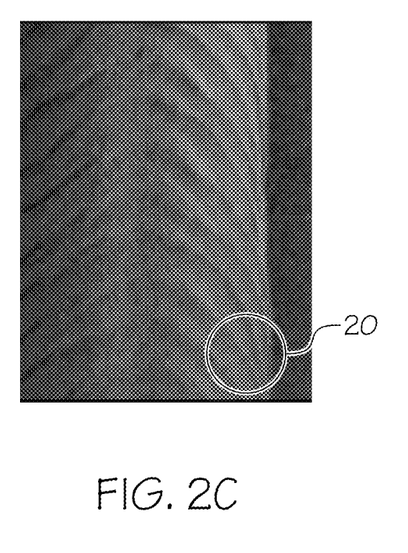

An effect of additions of lanthanide series elements on the resulting as-cast structure is shown in FIGS. 2A, 2B, and 2C. FIG. 2A shows, from left to right, the microstructures of the fusion zones of alloy nos. 1, 2, 3, 4, respectively, in the as-cast condition. FIG. 2B shows an enlarged view of a portion of the microstructure of alloy no. 1, and FIG. 2C shows an enlarged view of a portion of the microstructure of alloy no. 4. As evidenced by FIGS. 2A, 2B, and 2C, the addition of lanthanide series elements, in alloy nos. 2, 3, and 4, results in a refinement of the grain size of beta 20 in the fusion zone as compared to alloy no. 1, in which large elongated grains of beta 20 are visible in the fusion zone.

Figure 3A:
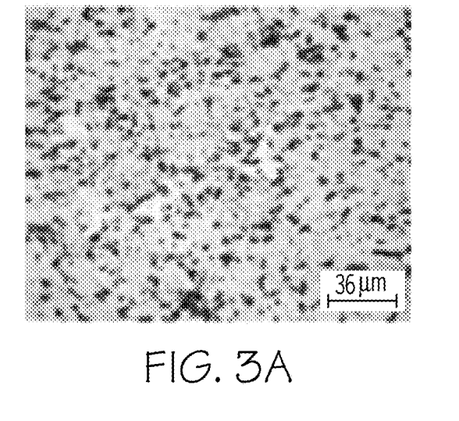
Figure 3B:
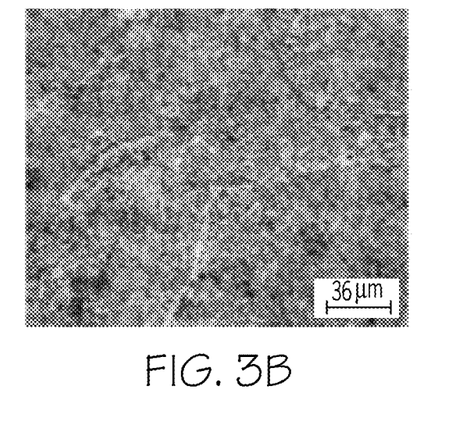
Figure 3C:
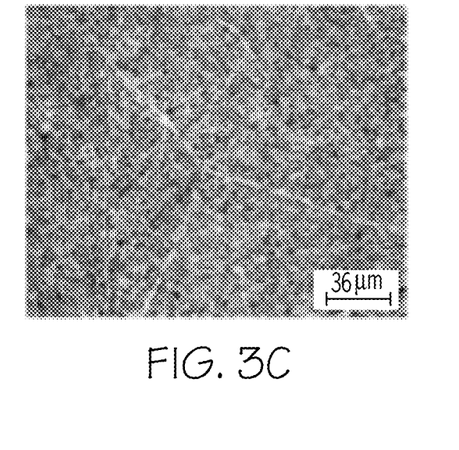
Figure 3D:
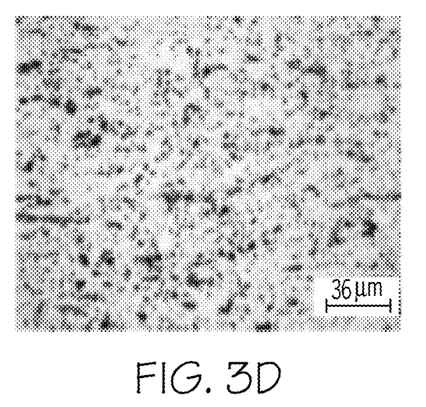
Figure 3E:
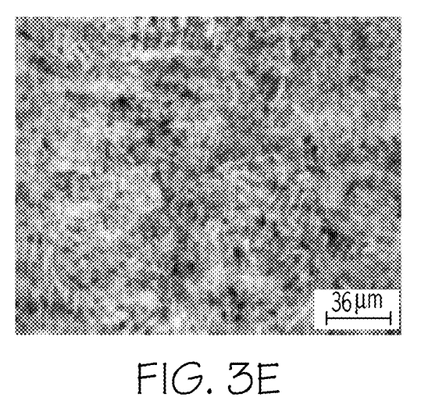
Figure 3F:
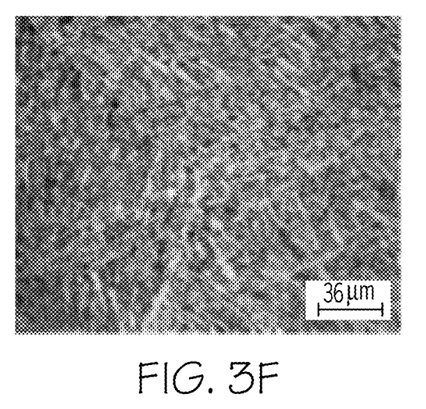
Figure 3G:
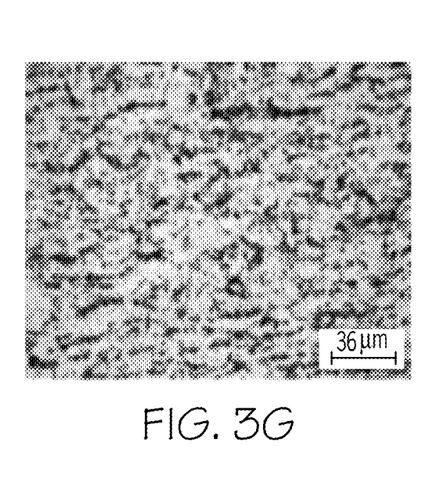
Figure 3H:
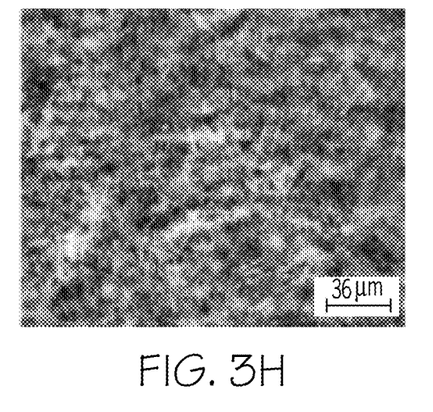
Figure 3I:
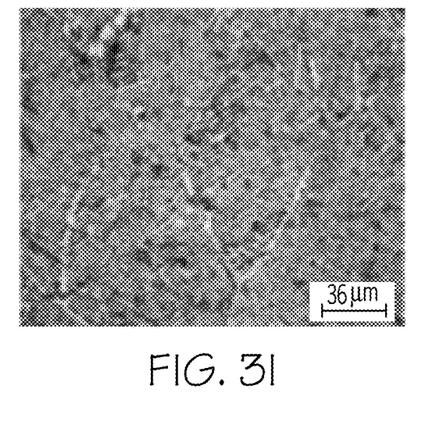

An effect of the additions of lanthanide series elements on the structure after annealing at 900 degrees C. for 60 minutes followed by air cooling is shown in FIGS. 3A through 3I. FIGS. 3A, 3B, and 3C show microstructures of the base metal, the heat affected zone, and the fusion zone, respectively, for alloy no. 1. FIGS. 3D, 3E, and 3F show microstructures of the base metal, the heat affected zone, and the fusion zone, respectively, for alloy no. 2. FIGS. 3G, 3H, and 3I shows microstructures of the base metal, the heat affected zone, and the fusion zone, respectively, for alloy no. 3. As evidenced by FIGS. 3A through 3I, the beta grain size is refined in fusion zone of the lanthanide series element containing titanium-based alloys.

Figure 4A:
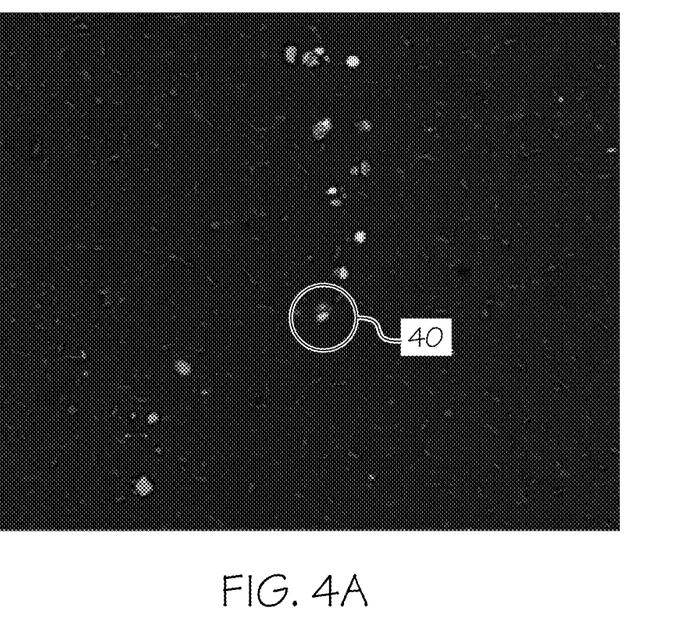
FIGS. 4A and 4B show microstructures containing lanthanide series element rich intermetallic particles.
Figure 4B:
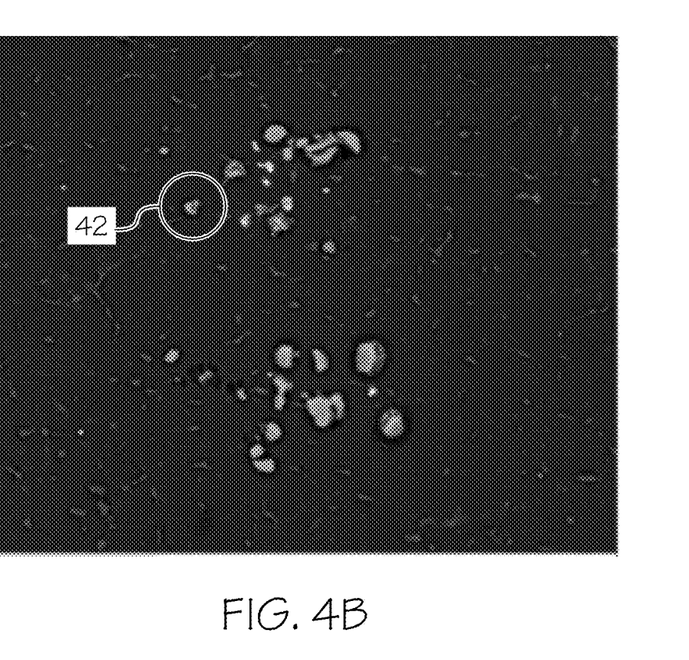

FIGS. 4A and 4B show the microstructures containing lanthanide series element rich intermetallic particles 40, 42. Table 2 shows analysis of the chemical compositions of intermetallic particles 40, 42.

TABLE 2

|  | Gd | Sn | Ti | Mo | Nb | Si | Al | Fe | Zr |
|---|---|---|---|---|---|---|---|---|---|
| "40" | 44.22 | 10.37 | 36.08 | 0.6838 | 0.6749 | 0.2239 | 4.98 | 0.0072 | 2.7586 |
| "42" | 55.14 | 22.09 | 17.94 | 0.4298 | 0.3319 | 0.0516 | 2.4719 | 0.0051 | 1.539 |

Although the present invention is not limited by theory, it is believed that these lanthanide series element rich intermetallic particles form and cluster during solidification and perturb the solid/liquid solidification front, and thereby limit growth of large grains of high-temperature beta phase, resulting in a finer grain size in the solidified microstructure.

Figure 5:
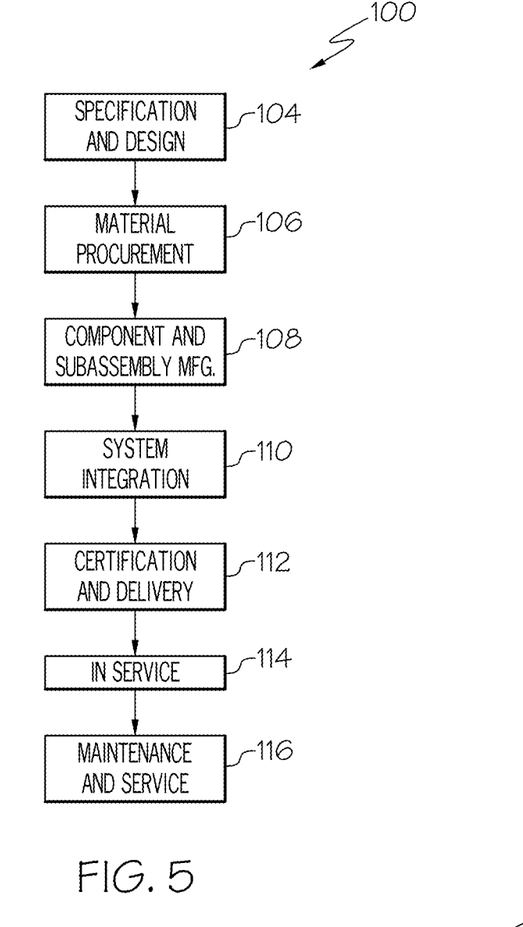
FIG. 5 is flow diagram of an aircraft manufacturing and service methodology.
Figure 6:
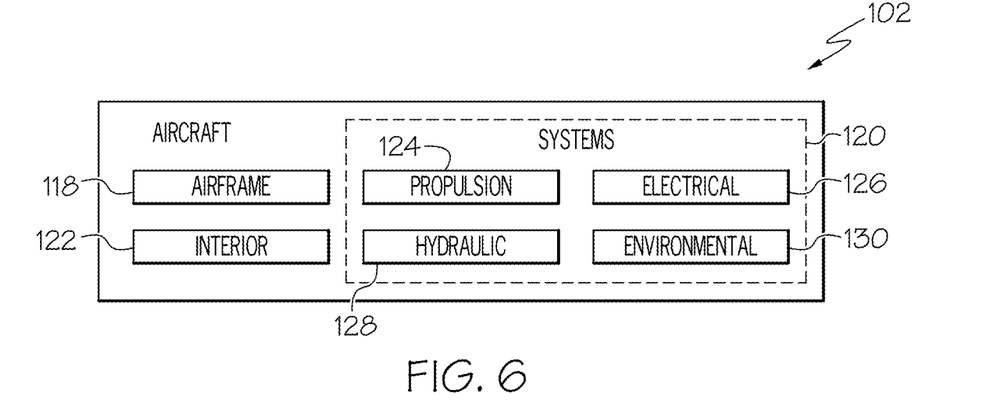
FIG. 6 is a block diagram of an aircraft.

Examples of the titanium-based alloy and method for manufacturing a titanium-based alloy component may be described in the context of an aircraft manufacturing and service method 100, as shown in FIG. 5, and an aircraft 102, as shown in FIG. 6. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The disclosed titanium-based alloy and method for manufacturing a titanium-based alloy component may be employed during any one or more of the stages of the aircraft manufacturing and service method 100, including specification and design 104 of the aircraft 102, material procurement 106, component/subassembly manufacturing 108, system integration 110, certification and delivery 112, placing the aircraft in service 114, and routine maintenance and service 116.

As shown in FIG. 6, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included. The disclosed titanium-based alloy and method for manufacturing a titanium-based alloy component may be employed for any of the systems of the aircraft 102, including the airframe 118, the plurality of systems 120, and the interior 922.

The disclosed titanium-based alloy and method for manufacturing a titanium-based alloy component are described in the context of an aircraft; however, one of ordinary skill in the art will readily recognize that the disclosed titanium-based alloy and method for manufacturing a titanium-based alloy component may be utilized for a variety of vehicles and non-vehicles. For example, implementations of the embodiments described herein may be implemented in any type of vehicle including, e.g., helicopters, passenger ships, automobiles and the like.

Although various embodiments of the disclosed titanium-based alloy and method for manufacturing a titanium-based alloy component have been shown and described, modifications may occur to those skilled in the art upon reading the specification. The present application includes such modifications and is limited only by the scope of the claims.

What is claimed is:

1. An alpha-beta titanium-based alloy comprising:
    titanium;
    one of the following lanthanide series elements:
        0.001-1.0 wt. % neodymium (Nd);
        0.001-1.0 wt. % dysprosium (Dy); or
        0.001-0.5 wt. % erbium (Er);
    0.01-1.0 wt. % niobium (Nb); and
    at least one of aluminum (Al), zirconium (Zr), tin (Sn), oxygen (O), molybdenum (Mo), vanadium (V), niobium (Nb), iron (Fe), and chromium (Cr) present in amounts defined based on an aluminum equivalent and a molybdenum equivalent, wherein the aluminum equivalent (Al-eq) is between 0 to 7.5% and the molybdenum equivalent (Mo-eq) is between 2.7 to 47.5, and wherein the aluminum equivalent (Al-eq) and the molybdenum equivalent (Mo-eq) are defined, in weight percents, as follows:

$$Al\text{-}eq = (Al\ \%) + (Zr\ \%)/6 + (Sn\ \%)/3 + 10*(O\ \%)$$

$$Mo\text{-}eq = (Mo\ \%) + 0.67*(V\ \%) + 0.33*(Nb\ \%) + 2.9*(Fe\ \%) + 1.6*(Cr\ \%).$$

2. The alpha-beta titanium-based alloy of claim 1 comprising neodymium (Nd) as the one lanthanide series elements.

3. The alpha-beta titanium-based alloy of claim 1 wherein the amount of neodymium (Nd) is 0.01-0.5% by weight.

4. The alpha-beta titanium-based alloy of claim 1 comprising dysprosium (Dy) as the one lanthanide series elements.

5. The alpha-beta titanium-based alloy of claim 1 wherein the amount of dysprosium (Dy) is 0.01-0.5% by weight.

6. The alpha-beta titanium-based alloy of claim 1 comprising erbium (Er) as the one lanthanide series elements.

7. The alpha-beta titanium-based alloy of claim 1 wherein the amount of erbium (Er) is 0.01-0.5% by weight.

8. The alpha-beta titanium-based alloy of claim 1 wherein the alpha-beta titanium-based alloy is in the form of a wire.

9. The alpha-beta titanium-based alloy of claim 1 wherein the alpha-beta titanium-based alloy is in the form of powder particulates.

10. The alpha-beta titanium-based alloy of claim 1 wherein the alpha-beta titanium-based alloy is in the form of a component of an aircraft.

11. The alpha-beta titanium-based alloy of claim 1 further comprising 5.0-7.0 wt. % aluminum (Al).

12. The alpha-beta titanium-based alloy of claim 1 further comprising 1.0-3.0 wt. % tin (Sn).

13. The alpha-beta titanium-based alloy of claim 1 further comprising 3.0-5.0 wt. % zirconium (Zr).

14. The alpha-beta titanium-based alloy of claim 1 further comprising 0.01-1.5 wt. % molybdenum (Mo).

15. The alpha-beta titanium-based alloy of claim 1 further comprising 0.01-1.0 wt. % silicon (Si).

16. The alpha-beta titanium-based alloy of claim 1 further comprising:
    5.0-7.0 wt. % aluminum (Al);
    1.0-3.0 wt. % tin (Sn);
    3.0-5.0 wt. % zirconium (Zr);
    0.25-0.75 wt. % niobium (Nb);
    0.01-1.5 wt. % molybdenum (Mo); and
    0.01-1.0 wt. % silicon (Si).

17. The alpha-beta titanium-based alloy of claim 1 further comprising:
    5.5-6.5 wt. % aluminum (Al);
    1.5-2.5 wt. % tin (Sn);
    3.5-4.5 wt. % zirconium (Zr);
    0.5-1.0 wt. % molybdenum (Mo); and
    0.1-0.5 wt. % silicon (Si).

18. A method for manufacturing a component of an aircraft, the component comprising the alpha-beta titanium-based alloy of claim 1, the method comprising:
    forming the component comprising the alpha-beta titanium-based alloy by an additive manufacturing process.

19. An additively manufactured component formed from the alloy of claim 1.

20. An alpha-beta titanium-based alloy comprising:
    titanium;
    0.001-0.5 wt. % of at least one of neodymium (Nd), dysprosium (Dy), and erbium (Er);
    5.0-7.0 wt. % aluminum (Al);
    1.0-3.0 wt. % tin (Sn);
    3.0-5.0 wt. % zirconium (Zr);
    0.25-0.75 wt. % niobium (Nb);
    0.01-1.5 wt. % molybdenum (Mo);
    0.01-1.0 wt. % silicon (Si); and
    at least one of oxygen (O), vanadium (V), iron (Fe), and chromium (Cr) present in amounts defined based on an aluminum equivalent and a molybdenum equivalent, wherein the aluminum equivalent (Al-eq) is between 0 to 7.5% and the molybdenum equivalent (Mo-eq) is between 2.7 to 47.5, and wherein the aluminum equivalent (Al-eq) and the molybdenum equivalent (Mo-eq) are defined, in weight percents, as follows:

$$Al\text{-}eq = (Al\ \%) + (Zr\ \%)/6 + (Sn\ \%)/3 + 10*(O\ \%)$$

$$Mo\text{-}eq = (Mo\ \%) + 0.67*(V\ \%) + 0.33*(Nb\ \%) + 2.9*(Fe\ \%) + 1.6*(Cr\ \%).$$

* * * * *